J. ALLOWAYS.
Cutter-Heads for Molding-Machines.

No. 142,548.  Patented September 9, 1873.

Witnesses:
Charles P. Houseum
William Martin.

Inventor.
John Alloways

UNITED STATES PATENT OFFICE.

JOHN ALLOWAYS, OF DECATUR, ILLINOIS.

IMPROVEMENT IN CUTTER-HEADS FOR MOLDING-MACHINES.

Specification forming part of Letters Patent No. 142,548, dated September 9, 1873; application filed July 30, 1870.

*To all whom it may concern:*

Be it known that I, JOHN ALLOWAYS, of Decatur, in the county of Macon and State of Illinois, have invented certain Improvements in Cutter-Heads for Molding-Machines, of which the following is a specification:

My invention relates to an improvement in cutter-heads for wood-molding machines; and consists of the method of securing the cutters or knives in the head by means of grooves in the spindle, and in a collar sliding on said spindle, the collar secured with a nut on the spindle.

Figure 1:
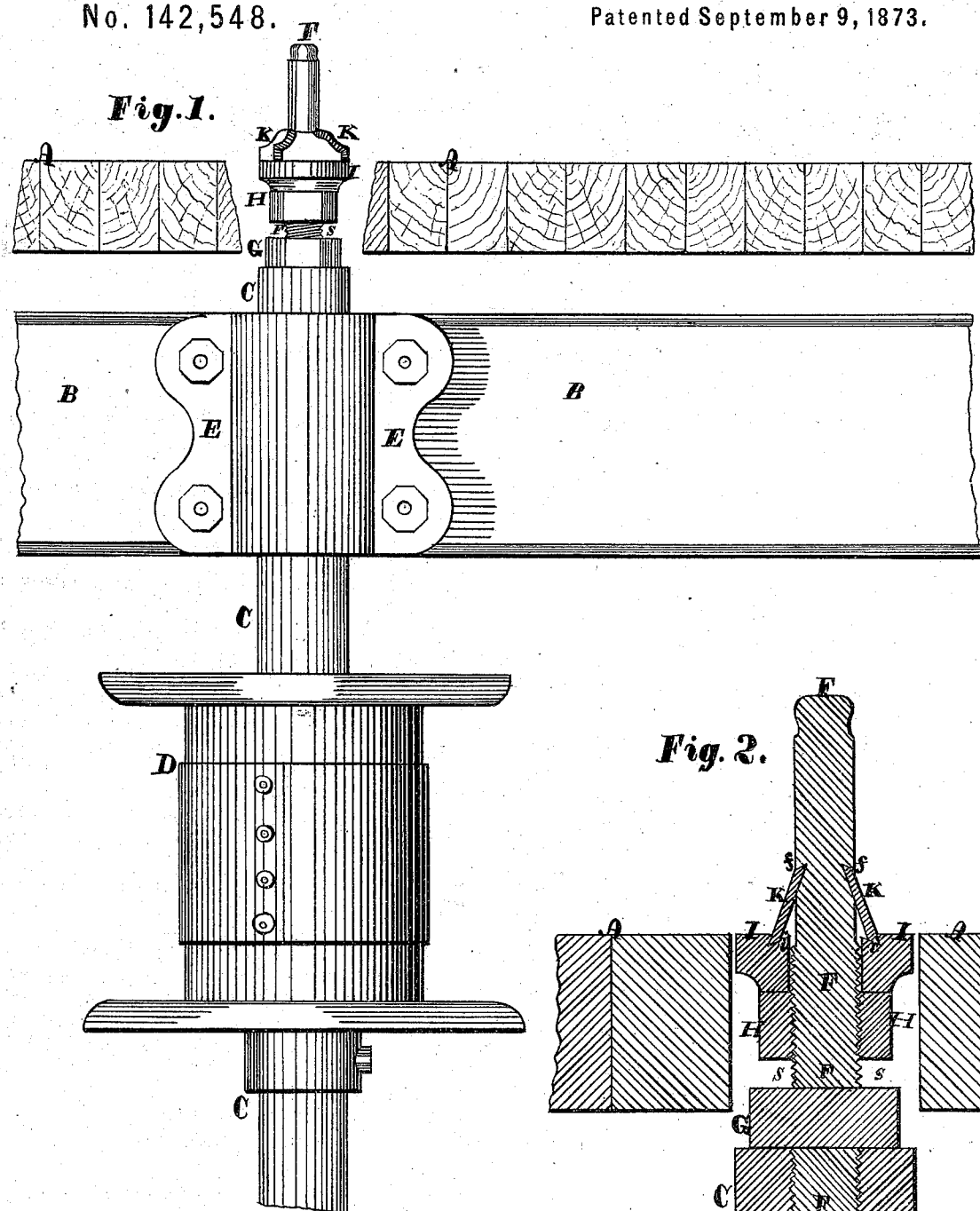
Figure 2:
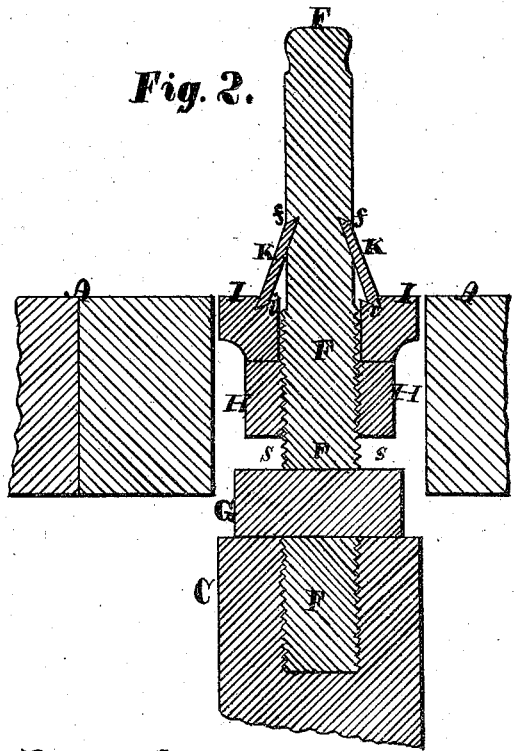

Figure 1 is a side view of a cutter-head and mandrel of a molding-machine, and embodies my invention; and Fig. 2 is a vertical central section of the same.

F is the spindle, which is screwed into the mandrel C by the nut G shrunk on the spindle. I is a collar around the spindle, grooved as shown at $i\,i$. $ff$ are grooves in the spindle. The knives K K are secured in the groves $ff$ and $i\,i$ by a nut, H, on the threaded part of the spindle, above the nut G, forcing and holding the collar up to the knives, the bearings on the knives being at the top and bottom of the same.

By this method of securing the knives in the head, and set at an angle, as shown in the drawing, only one cutter-head is required, the knives cutting equally well against as well as with the grain of the wood; and the smallness of the grooves in the spindle, to properly secure the knives, admit of a spindle of as small as $\frac{5}{16}$ (five-sixteenths) of an inch in diameter to be used, whereby moldings can be cut in curves of that diameter for bracket and other ornamental furniture-work.

The knives are readily placed after or removed for sharpening.

I claim as my invention—

The combination of the grooves $ff$ in the spindle F with the movable collar I, grooves $i\,i$, and nut H, so as to secure the knives K K in said grooves, substantially as described.

JOHN ALLOWAYS.

Witnesses:
    CHARLES P. HOUSUM,
    WILLIAM B. CHAMBERS.